Figure 1:
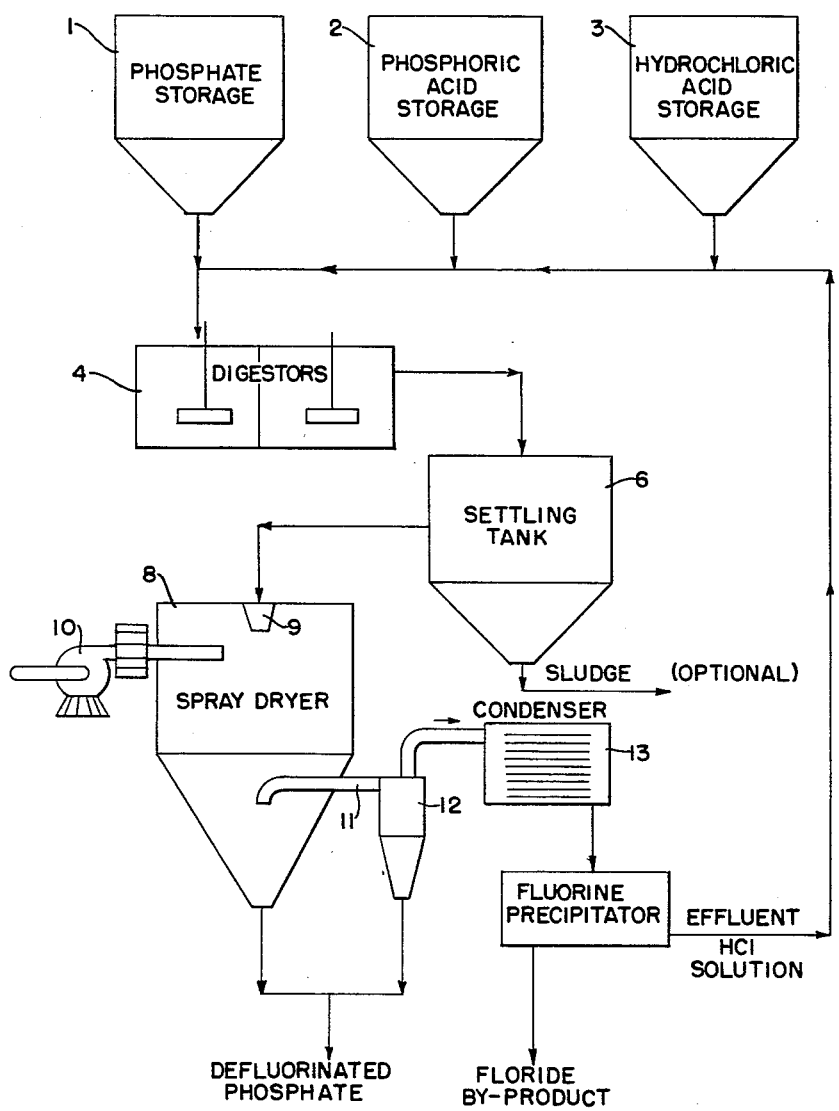

INVENTORS
CLINTON A. HOLLINGSWORTH
WILEY C. AUSTIN
LOUIS J. LAMB

BY
Pennie, Edmonds, Morton, Barrows & Taylor
ATTORNEYS

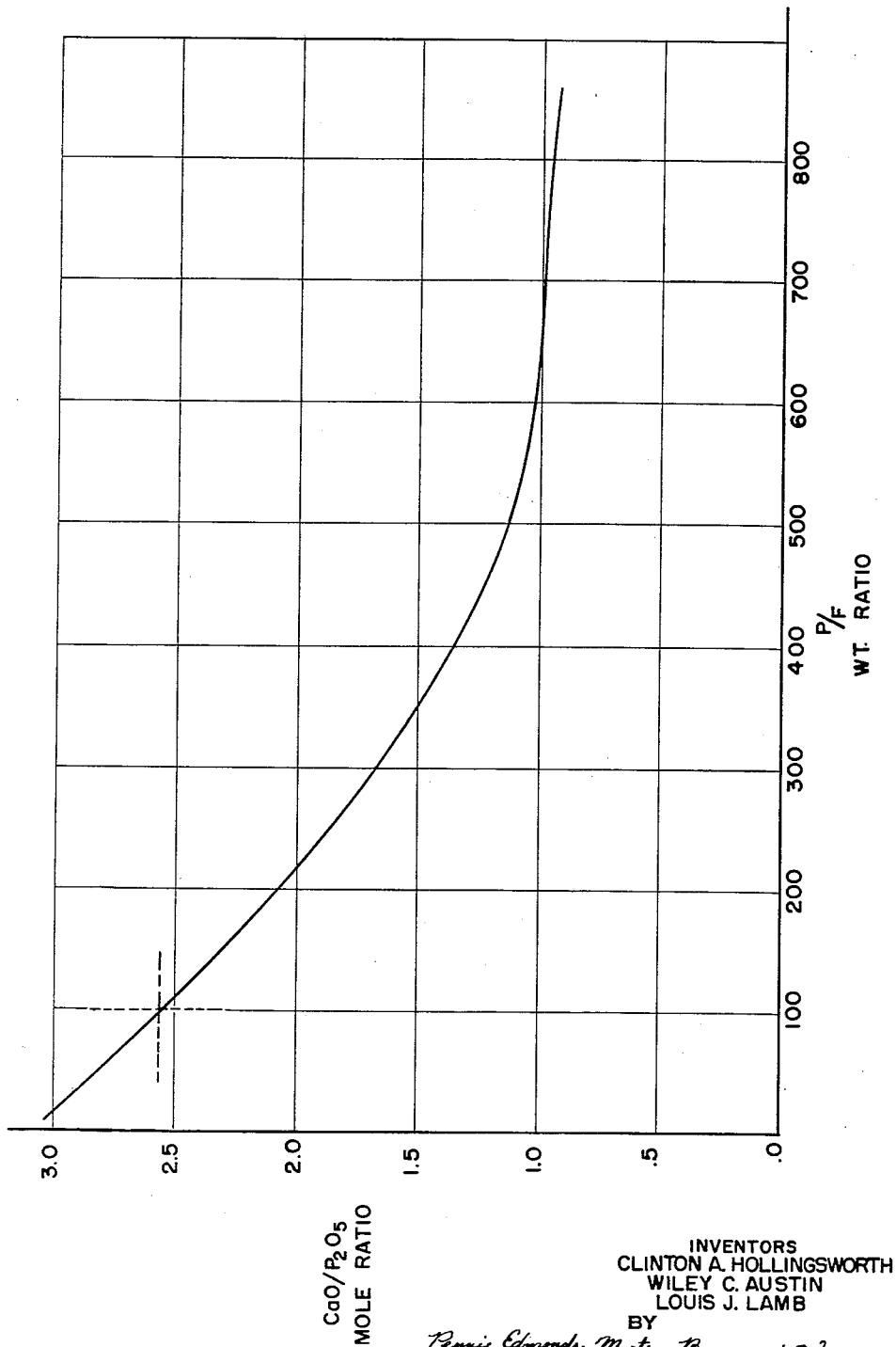

3,151,936
PROCESS FOR THE DEFLUORINATION
OF PHOSPHATES
Clinton A. Hollingsworth, Lakeland, Louis J. Lamb, Land O'Lakes, and Wiley C. Austin, Plant City, Fla., assignors to Smith-Douglass Company, Incorporated, Norfolk, Va., a corporation of Virginia
Filed Dec. 29, 1959, Ser. No. 862,546
10 Claims. (Cl. 23—109)

This invention relates to the defluorination of phosphate rock and similar fluorine-containing phosphatic material. In particular, it relates to a new wet-chemical process for obtaining a defluorinated phosphate product suitable for use both as a plant fertilizer and as an animal feed supplement.

Phosphate-containing materials are in great demand for use both as plant fertilizers and as animal food supplements, and the market for such materials is constantly growing. The principal sources of phosphates are the great natural deposits of pebble rock and phosphate rock found in Florida and in the Western States, and such widely distributed phosphatic minerals as apatite. Unfortunately, these naturally occuring phosphate materials contain combined fluorine in quantities which seriously interfere with the availability of the phosphate values when used as fertilizers and which are detrimental to health when used as animal food supplements. As a result these phosphatic materials cannot be used as fertilizers, and particularly as animal feed supplements, without costly treatment to reduce the fluorine content of the material below acceptable minimum amounts, the fluorine content of an acceptable animal feed supplement being less than one part of fluorine per 100 parts of phosphorus by weight. A great deal of effort has been devoted to the problem of developing economical and efficient processes for reducing the fluorine content of these phosphatic materials (hereinafter collectively referred to as phosphate rock) to acceptable limits. Thermal processes, such as electric furnace processes and calcination processses, have heretofore been the most economical and commercially successful methods of defluorinating phosphate rock. On the other hand, wet chemical processes, which seemingly would be less complicated and offer fewer operating difficulties than thermal processes, have proved to be expensive and time-consuming due to the multiple precipitation, filtration and drying steps heretofore required to effect defluorination by prior art wet chemical methods.

As a result of an intensive investigation directed at the development of an efficient and commercially economic wet chemical process for defluorinating phosphate rock, we have devised a new process which employs essentially merely digestion and drying steps to obtain a substantially defluorinated phosphate product, thereby avoiding the costly multiple precipitation and filtration steps of the prior art wet chemical processes. Our new defluorination process is based on our discovery that, when phosphate rock is digested with a mixture of phosphoric acid and certain volatile mineral acids, and when the resulting digestion liquor is subjected to thin film drying, substantially all of the fluorine and other volatile constituents of the digestion liquor are evolved therefrom to yield a substantially defluorinated phosphate product having high fertilizer and biological availability.

Accordingly, our new process for defluorinating phosphate material comprises digesting the fluoride-containing phosphate material with phosphoric acids and a volatile mineral acid capable of forming water-soluble calcium salts, the mineral acid preferably being selected from the group consisting of hydrochloric acid, nitric acid and perchloric acid and the weight ratio of the acid (calculated as equivalent HCl) to the phosphorus (calculated as $P_2O_5$) in the digestion mixture being at least about 0.3. The resulting digestion liquor is then subjected to thin film drying at a temperature sufficient to evaporate substantially all of the volatile constituents of the digestion liquor and to obtain a dry phosphate product containing less than 5% by weight of residual volatiles and less than one part of fluorine per 100 parts of phosphorus by weight. This dry defluorinated phosphate product has high fertilizer and biological availability and is suitable for use either as a plant fertilizer or an animal feed supplement without further treatment (other than possible blending with other fertilizer or animal feed constituents).

Our process will be better understood in conjunction with the accompanying drawings of which FIG. 1 is a flow sheet of a commercial plant for carrying out the process; and FIG. 2 shows graphically the inverse relationship between the $CaO/P_2O_5$ mole ratio of the digestion mixture and the P/F weight ratio of the dried product.

Referring first to the flow sheet shown in FIG. 1, the fluoride-containing phosphatic materials to be defluorinated are stored in a bin or tank 1. The materials that can be defluorinated by our new process include Florida pebble rock and phosphate concentrates, Western phosphate rock and concentrates, fluoride-containing phosphate minerals such as Virginia apatite, and, in general, all other materials which consist essentially of fluoride-containing calcium phosphates. Naturally occurring phosphatic materials are usually found admixed with varying amounts of gangue materials such as sand or clay, and it is common practice to beneficiate these phosphate materials to obtain a phosphate concentrate containing a relatively small amount of insoluble gangue. In accordance with our process, these phosphatic feed materials (for convenience herein collectively referred to as phosphate rock) are digested with certain specified amounts of phosphoric acid and one or more of certain volatile mineral acids to produce a digestion liquor that is then subjected to thin film drying to drive off substantially all the fluorine content of the liquor and to obtain a dry phosphate product containing less than 5% by weight of residual volatiles.

The phosphoric acid employed in the digestion step is stored in the tank 2. The acid is of commercial grade, and preferably is wet process phosphoric acid obtained by the acidulation of phosphate rock with sulfuric acid. Wet process phosphoric acid sometimes contains a small amount of residual fluorine which is, of course, introduced into the digestion mixture, this added fluorine being substantially completely removed from the calcium phosphate product during the subsequent thin film drying operation. The amount of phosphoric acid added to the digestion mixture is such that the mole ratio of the total amount of calcium (calculated as CaO) to the total amount of phosphorus (calculated as $P_2O_5$) in the mixture is not more than about 2.6, and preferably is within the range of about 0.9 and 1.1. A digestion mixture having a calcium to phosphorus ratio (hereinafter referred to as the $CaO/P_2O_5$ mole ratio) of about 1 will result in the formation of a defluorinated product predominantly containing monocalcium phosphate (or a calcium phosphate product analytically equivalent thereto). Lower $CaO/P_2O_5$ mole ratios produce a phosphate-rich monocalcium phosphate product, and higher ratios produce products containing correspondingly increasing amounts of such higher calcium phosphates as dicalcium phosphate. However, we have found that as the $CaO/P_2O_5$ mole ratio progressively increases the ease and degree of defluorination of the phosphate product progressively decrease, and that as the mole ratio approaches about 2.6 the P/F weight ratio of the dry product falls below the minimum acceptable ratio of 100.

The mineral acid added to the digestion mixture is stored in tank 3, this acid advantageously being supplemented or completely supplanted by regenerated mineral acid recycled from the fluorine precipitation and acid recovery step of our process. In general, the acid can be any acid more volatile than phosphoric acid which will form soluble calcium salts, and thus includes the halogen acids (except hydrofluoric acid), nitrogenous acids and the like. However, we presently prefer to use hydrochloric acid, nitric acid, perchloric acid or mixtures of these acids in the digestion step of our process, and the practice of our invention will be described specifically in connection with the use of hydrochloric acid. The amount of volatile mineral acid added to the digestion mixture should be such that the weight ratio of the mineral acid (calculated as the amount of HCl equivalent thereto) to the total amount of phosphorus (calculated as $P_2O_5$) in the digestion mixture is at least 0.3, and preferably is within the range of between about 0.7 and 1.0. Mineral acid to phosphorus ratios (hereinafter referred to as the $HCl/P_2O_5$ weight ratio) of less than about 0.3 result in inefficient or incomplete defluorination of the calcium phosphate product whereas $HCl/P_2O_5$ weight ratios in excess of about 1 are unnecessary and uneconomic in order to obtain a substantially completely defluorinated product. When mineral acids other than hydrochloric acid are employed, the aforementioned weight ratio is determined by converting the actual weight of mineral acid present in the digestion mixture to the weight of an equivalent amount of hydrochloric acid.

In addition to phosphoric acid and a volatile mineral acid, we have found that the presence of a minor amount of silica in the digestion mixture aids in the defluorination of the phosphate rock, apparently by combining with the fluorine content thereof to form volatile fluorides that are evolved more readily from the digestion liquor during the drying operation. Accordingly, when the phosphatic feed material contains no silica, or contains silica which is unavailable for reaction with fluorine, we have found it advantageous to add a minor amount of reactive silica such as diatomaceous earth, silica gel and other extremely finely divided or amorphous forms of silica to the digestion mixture to aid in the defluorination of the phosphate rock.

The amount of water present in the digestion mixture should be approximately sufficient to form a solution containing between about 20% to 50% by weight of solids—i.e., the calcium phosphates and other non-volatilized materials remaining after the subsequent thin film drying operation. Water vapor evolved during the subsequent drying operation aids in the defluorination of the phosphate material, and hence an increase in the amount of water in the digestion liquor tends to increase the degree of defluorination of the phosphate product. However, the increase in the degree of defluorination obtained by the presence in the digestion liquor of more water than will form a solution containing about 20% by weight of solids usually is not so significant as to warrant the added cost of evaporating this additional water.

The fluoride-containing phosphate rock feed material from the storage tank 1, phosphoric acid from the storage tank 2 and a volatile mineral acid (e.g., hydrochloric acid) from the storage tank 3 are introduced into the digesters 4 in the aforementioned specified proportions, together with such optional additives as reactive silica to aid in the defluorination of the phosphatic material, and trace amounts of elements beneficial to the growth of plants and animals such as iron, cobalt, copper, zinc etc. The digestion of the phosphate rock with phosphoric acid and hydrochloric acid results in the formation of an aqueous solution or slurry containing calcium phosphate (e.g., monocalcium phosphate), calcium chloride, hydrochloric acid, hydrofluoric acid, fluosilicic acid and other soluble salts and acids together with such insoluble matter as silica (e.g., sand), clay and other non-digested matter.

If the amount of insolubles present in the digestion liquor is so great as to interfere with the subsequent drying operation or to seriously dilute and downgrade the final calcium phosphate product, these insolubles should be removed prior to the drying operation. When this is the case, the digestion liquor is delivered to a settling tank 6 or equivalent clarification or filtration apparatus from which digestion liquor substantially free of insoluble matter is withdrawn or decanted for the subsequent thin film drying operation. On the other hand, if the amount of insoluble matter in the digestion liquor is not sufficient to interfere with the drying operation or to seriously dilute the ultimate calcium phosphate product, the digestion liquor clarification step advantageously is omitted and this digestion liquor is delivered directly to the thin film drying operation.

As employed herein, the term "thin film drying" refers to the drying of a thin layer or its equivalent, such as, for example, a highly porous mass or small particles, by heating a film or droplets of the digestion liquor to a temperature sufficient to drive off substantially all of the volatile constituents thereof (e.g., water, hydrochloric acid, hydrofluoric acid, silicon tetrafluoride, fluosilicic acid and the like) under conditions that minimize retention of these volatile constituents in the dried product. When the dried product contains more than about 5% by weight of residual volatiles, we have found that the product is usually insufficiently defluorinated so that the phosphorous to fluorine (P/F) ratio of the product is less than the minimum acceptable ratio of 100:1. Accordingly, the drying apparatus employed must be capable of heating a thin layer or small droplets of the digestion liquor to a temperature sufficient to evaporate substantially all of the aforementioned volatile constituents and to obtain a dried calcium phosphate product containing less than 5% by weight, and preferably less than 2% by weight, of residual volatile matter. On the other hand, drying conditions and temperatures should be such as to avoid excessively high product temperatures in order to minimize the formation of such insoluble forms of calcium phosphate as calcium metaphosphate and pydophosphate. With appropriate control of drying conditions, the temperature of the dried product on completion of the drying operation is normally between about 400° and 500° F., and seldom, if ever, exceeds about 1000° F.

Thin film drying can successfully be carried out in such drying apparatus as a drum dryer, a thin film evaporator, or a spray dryer such as the dryer 8 shown in the drawing. In the case of the spray dryer 8, the digestion liquor is sprayed into the interior of the dryer through the nozzle or other atomizing device 9 whereupon the fine droplets of digestion liquor are immediately contacted by and enveloped in a stream of hot combustion gases and/or air introduced into the dryer in large quantities by the blower 10. The volatile constituents of the droplets of digestion liquor evaporate almost instantly when introduced into the spray dryer, these volatile constituents being withdrawn from the dryer through the vapor exhaust line 11 and the dried defluorinated product collecting in the conical bottom of the dryer from whence it is withdrawn.

The dried product withdrawn from the spray dryer, or removed from the surface of a drum dryer or the like, contains less than about 5%, and preferably less than about 2% by weight of residual volatiles, the residual volatiles consisting mainly of $H_2O$ and HCl together with relatively insignificant amounts of fluorine. A product produced in accordance with our process containing less than 5% by weight of volatiles is dry to the eye and to the touch, is substantially defluorinated so that it is acceptable as an animal feed supplement, and has very high fertilizer and biological phosphate availability. Specifically, our new calcium phosphate product contains less than one part of fluorine per 100 parts of phosphorus by weight, and it is at least about 90% to 100% soluble in aqueous solutions of 0.4% HCl, of 2.0% citric acid, and of neutral ammonium citrate. The dried product consists essentially of a mixture of calcium phosphates—preferably predominantly in the form of monocalcium phosphate—together with deliberate additives such as trace amounts of elements beneficial to the growth of plants and animals and insoluble matter not removed during the optional digestion liquor clarification operation. The specific form of the calcium phosphates present in the dried product is not known with certainty. However, in addition to the calcium orthophosphates known to be present, there appear to be minor amounts of metaphosphates also present therein. If desired, the product can be subjected to subsequent treatment, e.g., autoclaving, to insure that all of the phosphates are present in their ortho form.

The volatile constituents of the digestion liquor withdrawn from the spray dryer 8 through the vapor exhaust line 11 are first introduced into a cyclone 12 which removes any of the fine particles of the solid product which may have been entrained in the exhaust vapors, these fine particles being added to the dry product withdrawn from the bottom of the drying apparatus. The exhaust vapors are then introduced into a condenser 13 which condenses the water content thereof to form an aqueous solution of hydrochloric acid, hydrofluoric acid, fluosilicic acid and the like. The fluorine content of the resulting aqueous solution is advantageously removed therefrom and recovered as a valuable by-product of the process by the addition of a metal salt such as those of sodium or potassium which will form insoluble fluosilicates that precipitate from the condensate, and we presently prefer to add potassium chloride to the aqueous condensate in order to precipitate the fluorine content thereof in the form of potassium fluosilicate. The aqueous solution remaining after the precipitation and recovery of the fluorine content thereof comprises essentially a solution of hydrochloric acid which advantageously is recycled to the digestion step of the process. Of course, when an acid other than hydrochloric acid is employed as the volatile mineral acid in the digestion step of the process, an appropriate salt of this mineral acid, e.g., potassium nitrate, is added to the condensate to precipitate the fluorine content thereof and regenerate the mineral acid for recycling to the digestion step of the process. The amount of hydrochloric acid recovered as a by-product of the process and recycled to the digestion step of the process is ordinarily more than adequate to supply the mineral acid requirements of the digestion step, the only fresh hydrochloric acid from the acid storage tank 3 that need be added to the digestion step being that required to make up for mechanical and chemical losses of chloride ions which may occur in the course of the process.

The following examples are illustrative but not limitative of the practice of our process.

EXAMPLE I

A digestion mixture was prepared from a phosphate concentrate containing 76.0% by weight of bone phosphate of lime (BPL), wet process phosphoric acid containing 48% $P_2O_5$, hydrochloric acid containing 37.4% HCl and reactive silica in the form of diatomaceous earth containing 85% $SiO_2$. The proportions by weight and on a dry basis of these reactants in the mixture were as follows:

*Table 1a*

| | Percent |
|---|---|
| Phosphate concentrate | 34.93 |
| $P_2O_5$ from phosphoric acid | 30.74 |
| HCl from hydrochloric acid | 33.42 |
| $SiO_2$ from reactive silica | 0.91 |
| Total (dry basis) | 100.00 |
| $CaO/P_2O_5$ mol ratio | 1.04 |
| $HCl/P_1O_5$ weight ratio | 0.78 |

The resulting digestion mixture contained 53.06% by weight of solids including 17.73% by weight of HCl which, as a volatile constituent, should be removed from the ultimate product by evaporation during the subsequent thin film drying operation. The digestion mixture was agitated about one hour at room temperature, the resulting product of the digestion operation was allowed to stand to settle the insolubles (e.g., sand) therein, and the resulting clarified digestion liquor was decanted from the insoluble materials. The decanted solution was analyzed and found to contain (percent by weight):

*Table 1b*

| | |
|---|---|
| $P_2O_5$ | 21.72 |
| P | 9.49 |
| F | 0.77 |
| P/F (weight ratio) | 12.3 |

A thin film approximately 1/16 inch thick of the clarified digestion liquor was dried on a stainless steel plate at 464° F., and the dried product containing no appreciable residual moisture was analyzed and found to contain (percent by weight):

*Table 1c*

| | |
|---|---|
| $P_2O_5$ | 62.60 |
| P | 27.4 |
| F | 0.04 |
| P/F | 683 |

The solution was also introduced into a conventional spray dryer employing an air inlet temperature of 1000° F. The temperature of the exhaust gases was 550° F. and that of the dried product about 500° F. The dried product recovered from the spray dryer contained virtually no residual volatiles. The product was analyzed, and its solubility in dilute solutions of hydrochloric acid (HCl), citric acid (Cit.) and neutral ammonium citrate (NAC) was determined. The analysis and solubility (in percent by weight and percent of total phosphorous, respectively) of the dried product were as follows:

*Table 1d*

| | |
|---|---|
| Analysis: | |
| $P_2O_5$ | 60.20 |
| P | 26.30 |
| F | 0.15 |
| P/F | 175 |
| Solubility: | |
| 0.4% HCl | 99.3 |
| 2.0% Cit. | 98.6 |
| NAC | 100.0 |

The composition of the product was analytically equivalent to that of normal monocalcium phosphate, the phosphorous to fluorine ratio was well above the minimum acceptable for use as an animal feed supplement (i.e., 100), and the solubility of the product in hydrochloric acid, citric acid and neutral ammonium citrate was evidence of high fertilizer and biological availability of the phosphorous content of the product.

EXAMPLE II

A digestion mixture was prepared from the same starting materials as in Example I, the phosphoric acid ($P_2O_5$) content of the mixture being increased to produce a high phosphorus-monocalcium phosphate product. The proportions by weight and on a dry basis of the reactants in the digestion mixture were as follows:

Table 2a

| | Percent |
|---|---|
| Phosphate concentrate | 24.34 |
| $P_2O_5$ from phosphoric acid | 38.65 |
| HCl from hydrochloric acid | 36.34 |
| $SiO_2$ from reactive silica | 0.67 |
| Total (dry basis) | 100.00 |

$CaO/P_2O_5$ _____mole ratio__ 0.64
$HCl/P_2O_5$ _____weight ratio__ 0.77

The resulting digestion mixture contained 52.7% by weight of solids including 17.8% by weight of HCl. The mixture was digested, the resulting digestion liquor clarified, and the clarified liquor both plate and spray dried in the same manner as in Example I. The spray dried and plate dried products contained 1.5% and 0.0% by weight of residual moisture, respectively. The analysis and solubility of the products of both drying operations were as follows:

Table 2b

| Dryer | Analysis | | | | Solubility | | |
|---|---|---|---|---|---|---|---|
| | $P_2O_5$ | P | F | P/F | 0.4% HCl | 2.0% Cit. | NAC |
| Plate | 67.14 | 29.3 | 0.014 | 2,092 | 94.44 | 91.0 | 100 |
| Spray | 65.94 | 28.8 | 0.035 | 823 | 100.00 | 100.0 | 100 |

The high phosphorus-monocalcium phosphate product obtained had a high P/F ratio and a citrate solubility indicatice of high fertilizer and biological availability of the phosphorus content thereof.

EXAMPLE III

A digestion mixture was prepared from the same starting materials as employed in Example I with the exception that concentrated nitric acid was substituted for the hydrochloric acid of Example I. The proportions by weight and on a dry basis of the reactants in the digestion mixture were as follows:

Table 3a

| | Percent |
|---|---|
| Phosphate concentrate | 27.05 |
| $P_2O_5$ from phosphoric acid | 25.48 |
| $HNO_3$ from nitric acid | [1]46.73 |
| $SiO_2$ from reactive silica | 0.74 |
| Total (dry basis) | 100.00 |

$CaO/P_2O_5$ _____mole ratio__ 0.95
$HCl/P_2O_5$ _____weight ratio__ 0.77

[1] Equivalent to 26.70% by weight of HCl.

The resulting digestion mixture contained 68.4% by weight of solids including 31.95% by weight of $HNO_3$ which, as a volatile constituent, should be removed from the ultimate product by evaporation during the subsequent thin film drying operation. After digestion and clarification of the resulting digestion liquor, the clarified liquor was dried in a thin film on a stainless steel plate at 450° F., and a further portion of the liquor was dried in a thin film on the plate at a temperature of 950° F.

The analysis of the dried products obtained were as follows:

Table 3b

| Temp., ° F. | $P_2O_5$ | P | F | P/F |
|---|---|---|---|---|
| 450 | 58.57 | 25.6 | 0.17 | 155 |
| 950 | 64.86 | 28.32 | 0.016 | 1,770 |

The monocalcium phosphate product obtained was snow white, apparently due to the oxidizing properties of nitric acid. The increase in degree of defluorination of the product dried at 950° F. as compared with the product dried at 450° F. apparently is due to the elimination of substantially all of the residual volatile nitrogen compounds in the product.

EXAMPLE IV

A digestion mixture was prepared from the same starting materials as in Example I with the exception that perchloric acid was substituted for hydrochloric acid in the mixture. The proportions by weight and on a dry basis of the reactants in the digestion mixture were as follows:

Table 4a

| | Percent |
|---|---|
| Phosphate concentrate | 21.46 |
| $P_2O_5$ from phosphoric acid | 18.88 |
| $HClO_4$ from perchloric acid | [1]59.10 |
| $SiO_2$ from reactive silica | 0.56 |
| Total (dry basis) | 100.0 |

$CaO/P_2O_5$ _____mole ratio__ 1.00
$HCl/P_2O_5$ _____weight ratio__ 0.82

[1] Equivalent to 21.28% by weight of HCl.

The resulting digestion mixture contained 69.0% by weight of solids including 41.25% by weight of $HClO_4$ which, as a volatile constituent, should be removed from the ultimate product during the subsequent thin film drying operation. The resulting digestion liquor was dried on a stainless steel plate at 950° F., and the resulting dried product was analyzed with the following results:

Table 4b

| | |
|---|---|
| $P_2O_5$ | 53.98 |
| P | 25.69 |
| F | 0.004 |
| P/F | 5900 |

EXAMPLE V

Comparison of the P/F ratio of the normal monocalcium phosphate product of Example I with the P/F ratio of the high phosphorus-monocalcium phosphate product of Example II indicates that a higher degree of defluorination is made possible by increasing the phosphorus content of the digestion mixture and resulting digestion liquor. Apparently this is due to the proportionate reduction of the metallic cation (calcium) content of the digestion liquor, the metallic cations tending to react with the fluorine content of the digestion liquor thereby inhibiting the defluorination of the liquor and the dry product in accordance with the relative stability of the fluorine compounds formed. To determine the maximum amount of calcium that can be present in the digestion mixture without decreasing the P/F ratio of the ultimate dry product below the minimum acceptable ratio of 100, a series of comparative tests were conducted to establish the upper limit for the $CaO/P_2O_5$ mole ratio of the digestion mixture. Digestion mixtures of varying compositions were prepared in the usual manner, the resulting digestion liquor was dried on a stainless steel plate at 464°, and the P/F weight ratio of the resulting dry product was determined with the following results:

Table 5

| Feed Material | CaO/P$_2$O$_5$, Mole Ratio | P/F, Weight Ratio |
|---|---|---|
| Tricalcium Phosphate | 3.0 | 13.5 |
| 50% Dicalcium Phosphate; 50% Monocalcium Phosphate | 1.5 | 350 |
| Monocalcium Phosphate | 1.0 | 683 |

The foregoing data is represented graphically in FIG. 2 of the drawing, and from this it will be seen that a CaO/P$_2$O$_5$ ratio of about 2.6 will result in a P/F weight ratio of 100 which, as noted, is the minimum acceptable for an animal food supplement.

EXAMPLE VI

A series of comparative tests were conducted to determine the effect of the thickness of the layer of digestion liquor and of the ultimate dry product on the degree of defluorination obtained, as indicated by the P/F ratio of the ultimate product. A solution of monocalcium phosphate was prepared in the usual manner, the digestion liquor having a CaO/P$_2$O$_5$ mole ratio of 1.0, a HCl/P$_2$O$_5$ weight ratio of 0.80, and containing 34.7% by weight of non-volatilized solids. A small quantity of the digestion liquor was introduced into each of several 400 ml. beakers, the depth of the liquid in each beaker measuring ⅛″, ¼″, ½″, 1″ and 1½″, respectively. The layers in each of the beakers were then dried on a hot plate at 450° F., the dried product in each case containing no appreciable residual moisture, and the thickness of the film of dry product being roughly one-third the depth of the original layer of digestion liquor. The P/F ratio of the dry product in each beaker was then determined with the following results:

Table 6

| Film Thickness, inches | | P/F, wt. ratio |
|---|---|---|
| Liquor | Product (approx.) | |
| ⅛ | 1/24 | 213 |
| ¼ | 1/12 | 170 |
| ½ | 1/6 | 103 |
| 1 | ⅓ | 88 |
| 1½ | ½ | 74 |

From the foregoing results it will be seen that an increase in thickness of the liquid film, and hence in the thickness of the film of dry product, adversely affects the P/F ratio obtained. The specific P/F ratios reported above, of course, were those obtained when various thicknesses of a specific digestion liquor were dried under certain specific conditions, and these P/F ratios are not necessarily representative of the ratios that would be obtained with other digestion liquors and under other drying conditions (e.g., on a drum drier or in a spray drier). However, the inverse relationship between film thickness and P/F ratio remains essentially the same in all cases.

EXAMPLE VII

A series of comparative tests were conducted to determine the effect of product temperature and/or residual moisture content on the degree of defluorination obtained, as indicated by the P/F ratio of the ultimate product. In each case the digestion mixture was essentially the same as that employed in Example I. In a first series of tests, the digestion liquor was dried on a stainless steel plate at various temperatures, the dry products obtained having an average phosphorus content of 26.8% by weight and the following P/F ratios:

Table 7a

| | Sample | | | | |
|---|---|---|---|---|---|
| | 1 | 2 | 3 | 4 | 5 |
| Temp., ° F | 243 | 320 | 374 | 392 | 464 |
| P/F | 140 | 219 | 357 | 391 | 628 |

In a second series of tests, the digestion liquor was spray dried employing various rates of feed of the liquor and various air inlet and outlet temperatures, all of which factors affect the temperature and residual moisture content of the dried product. The following results were obtained:

Table 7b

| | 1 | 2 | 3 | 4 |
|---|---|---|---|---|
| Feed rate, ml./min | 210–280 | 250–400 | 150–200 | 200–300 |
| Gas inlet temp., ° F | 430 | 580 | 580 | 1,000 |
| Gas outlet temp., ° F | 280 | 290 | 390 | 540 |
| Product: | | | | |
| Temp., ° F | 240 | 250 | 340 | 490 |
| Moisture, percent | 8.0 | 8.0 | 2.2 | 0.0 |
| P | 22.6 | 23.0 | 24.4 | 25.8 |
| F | 0.28 | 0.29 | 0.17 | 0.17 |
| P/F | 78 | 79 | 143 | 152 |

From the foregoing results it is evident that the degree of defluorination of the dry product is directly related to the residual moisture content of the product which, in turn, is related to the temperature the product attains during the drying operation. Our investigations have determined that the ultimate product will usually be insufficiently defluorinated (i.e., have a P/F ratio of less than 100) when the residual moisture or volatile content exceeds about 5% by weight, and we have found it preferable to reduce the residual moisture content of the product to below about 2% by weight.

EXAMPLE VIII

Comparative tests were conducted to determine the effect, if any, of the addition of the reactive silica to the reaction mixture on the degree of defluorination obtained, as indicated by the P/F ratio of the dried product. The digestion mixture was essentially the same as that employed in Example I, the resulting digestion liquor being dried on a stainless steel plate at 375° F. with the following results:

Table 8

| Sample | P | F | P/F |
|---|---|---|---|
| W/o silica | 28.1 | 0.27 | 104 |
| With silica | 28.6 | 0.08 | 357 |

The foregoing results indicate that the addition of reactive silica to the digestion mixture, while not essential in order to obtain an acceptable P/F ratio, appreciably increases the degree of defluorination of the ultimate product.

We claim:
1. Process for defluorinating phosphate rock which comprises digesting the phosphate rock with phosphoric acid and at least one mineral acid that is more volatile than phosphoric acid and that forms water soluble calcium salts, the weight ratio of the volatile mineral acid (calculated as equivalent HCl) to the phosphorus (calculated as P$_2$O$_5$) in the digestion mixture being at least about 0.3, subjecting the resulting digestion liquor to thin film drying to evaporate substantially all of the volatile constituents therefrom, and recovering a dry defluorinated calcium phosphate product containing less than 5% by weight of residual volatiles and less than one part of fluorine per 100 parts of phosphorus by weight.

2. Process according to claim 1 in which the weight ratio of the volatile mineral acid to the phosphorus in the digestion mixture is between about 0.3 and 1.0.

3. Process according to claim 1 in which the weight ratio of the volatile mineral acid to the phosphorus in the digestion mixture is between about 0.7 and 1.0.

4. Process according to claim 1 in which the volatile mineral acid is selected from the group consisting of hydrochloric acid, nitric acid and perchloric acid.

5. Process according to claim 1 in which the mole ratio of calcium (calculated as CaO) to phosphorus (calculated as $P_2O_5$) in the digestion mixture is not more than about 2.6.

6. Process according to claim 5 in which the mole ratio of calcium to phosphorus in the digestion mixture is between about 0.9 and 1.1.

7. Process according to claim 1 in which a minor amount of reactive silica is added to the digestion mixture.

8. Process according to claim 1 in which the effluent vapors withdrawn from the dryer are condensed, the fluorine content of the resulting condensate is separated therefrom and the remaining condensate is recirculated to the digestion step of the process.

9. Process for defluorinating phosphate rock which comprises digesting the phosphate rock with phosphoric acid and at least one volatile acid selected from the group consisting of hydrochloric acid, nitric acid and perchloric acid, the mole ratio of calcium (calculated as CaO) to phosphorus (calculated as $P_2O_5$) in the digestion mixture being not more than about 2.6 and the weight ratio of volatile acid (calculated as equivalent HCl) to phosphorus (calculated as $P_2O_5$) in said mixture being being at least about 0.3, subjecting the resulting digestion liquor to thin film drying at a temperature sufficient to evaporate substantially all of the volatile constituents thereof and to obtain a dry product containing less than 5% by weight of residual volatiles, recovering a dry defluorinated calcium phosphate product containing less than one part by weight of fluorine per 100 parts by weight of phosphorus, condensing the effluent volatile salt, acid and water vapors from the dryer, separating the fluorine content of the resulting condensate, and recirculating the remaining condensate comprising essentially an acidic aqueous solution to the digestion step of the process.

10. Process according to claim 9 in which a water-soluble salt of an alkali metal selected from the group consisting of sodium and potassium is added to the condensed effluent vapors from the dryer to precipitate the fluorine content of the condensate in the form of the corresponding alkali metal fluosilicate.

References Cited in the file of this patent

UNITED STATES PATENTS

| | | |
|---|---|---|
| 2,778,722 | Hollingsworth | Jan. 22, 1957 |
| 2,865,710 | Le Baron | Dec. 23, 1958 |
| 2,895,799 | Le Baron et al. | July 21, 1959 |
| 2,898,207 | Schilling et al. | Aug. 4, 1959 |